US006507665B1

(12) United States Patent
Cahill et al.

(10) Patent No.: US 6,507,665 B1
(45) Date of Patent: *Jan. 14, 2003

(54) METHOD FOR CREATING ENVIRONMENT MAP CONTAINING INFORMATION EXTRACTED FROM STEREO IMAGE PAIRS

(75) Inventors: Nathan D. Cahill, Rochester, NY (US); Shoupu Chen, Rochester, NY (US)

(73) Assignee: Eastman Kodak Company, Rochester, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/383,573

(22) Filed: Aug. 25, 1999

(51) Int. Cl.[7] .................................................. G06K 9/36
(52) U.S. Cl. ........................ 382/154; 382/284; 382/285; 382/294
(58) Field of Search ................................. 382/154, 284, 382/285, 294; 356/12; 359/462; 396/324; 348/42, 43, 46, 47, 50, 36

(56) References Cited

U.S. PATENT DOCUMENTS

| | | | | |
|---|---|---|---|---|
| 5,963,664 A | * | 10/1999 | Kumar et al. | 382/154 |
| 6,011,558 A | * | 1/2000 | Hsieh et al. | 345/435 |
| 6,023,588 A | * | 2/2000 | Ray et al. | 396/20 |
| 6,075,905 A | * | 6/2000 | Herman et al. | 382/284 |
| 6,078,701 A | * | 6/2000 | Hsu et al. | 382/284 |
| 6,128,108 A | * | 10/2000 | Teo | 382/284 |
| 6,157,747 A | * | 12/2000 | Szeliski et al. | 382/284 |
| 6,249,616 B1 | * | 6/2001 | Hashimoto | 382/284 |
| 6,434,265 B1 | * | 8/2002 | Xiong et al. | 382/154 |

OTHER PUBLICATIONS

Kang et al. "3–D Scene Data Recovery Using Omnidirectional Multibaseline Stereo." Proc. 1996 IEEE Computer Society Conf. on Computer Vision and Pattern Recognition, Jun. 1996, pp.364–370.*

"QuickTime VR—An Image–Based Approach to Virtual Environment Navigation" by Shenchang Eric Chen, Apple Computer, Inc., pp. 29–38, 1995.

"Stereo by Intra–and Inter–Scanline Search Using Dynamic Programming" by Yuichi Ohta and Takeo Kanade. IEEE Transactions on Pattern Analysis and Machine Intelligence, vol. PAMI–7, No. 2, Mar. 1985.

A Maximum Likelihood Stereo Algorithm, by Ingemar J. Cox, Sunita L. Hingorani, Satish B. Rao, and Bruce M. Maggs. Computer Vision and Image Understanding, vol. 63, No. 3, pp. 542–567, 1996.

"Panoramic Stereo Imaging System with Automatic Disparity Warping and Seaming" by Ho–Chao Huang and Yi–Ping Hung. Graphical Models and Imaging Processing. vol. 60, No. 3, pp. 196–208, 1998. Article No. IP980467.

* cited by examiner

Primary Examiner—Jon Chang
(74) Attorney, Agent, or Firm—David M. Woods (57) ABSTRACT

A technique of synthesizing a panoramic environment map containing intensity and range information of a scene, which includes estimation of orthographic range from a plurality of pairs of stereo images, transformation of orthographic range estimates to perspective or directional range estimates, transformation of planar intensity and range images to cylindrical images, registration of overlapping cylindrical images, and blending of intensity and range information.

18 Claims, 7 Drawing Sheets

METHOD FOR CREATING ENVIRONMENT MAP CONTAINING INFORMATION EXTRACTED FROM STEREO IMAGE PAIRS

CROSS-REFERENCE TO RELATED APPLICATION(S)

Reference is made to commonly assigned applications Ser. No. 09/162,310, entitled "Method and Apparatus for Capturing Panoramic Images with Range Data", filed Sep. 28, 1998 in the names of Lawrence A. Ray, Carl N. Schauffele and Brett VanSprewenburg, now U.S. Pat. No. 6,023,588 and Ser. No. 09/382,451 entitled "Method for Forming a Depth Image from Digital Image Data" and filed on even date herewith in the name of Shoupu Chen, each of which are assigned to the assignee of this application.

FIELD OF THE INVENTION

The invention relates generally to the field of panoramic image formation, and in particular to generating environment maps containing information extracted from pairs of stereo images.

BACKGROUND OF THE INVENTION

There is a growing number of imaging applications where the viewer has the perception of being able to move about a virtual environment. One method of developing such a virtual environment is to capture a plurality of images, which can be combined into a 360° panoramic view. Panoramic images can be considered as capturing an image as if the capture medium, e.g., film, were wrapped in a cylinder. For applications such as virtual reality, a portion of the image is transformed to appear as if the image were captured with a standard photographic system. However, since optical systems are not easily built which capture images on cylindrical photoreceptors, a variety of methods have been developed to provide the functionality. Panoramic stitching is a method that can be used to generate a 360° (or less) panoramic image from a series of overlapping images acquired from an ordinary camera. S. E. Chen describes the process of panoramic stitching in *Quick Time VR—An Image-based Approach to Virtual Environment Navigation*, Proc. SIGGRAPH '95, 1995, pp. 29–38.

Because conventional panoramic images do not have range associated with the objects in the scene, there are many potential applications of virtual-reality which are not accomplished easily. One such application is the ability to introduce objects synthetically into a panoramic image and interact with the image as one might like. For instance, if the objects are a distance d from the camera and a synthetic object is de be placed midway and have the zooming property of virtual images to operate in a manner appearing normal, the range must be known. Also, if synthetic objects are to interact with real objects in the image, the range information is critical. However, since the panoramic image capture systems do not acquire images from different vantage points, it is unreasonable to expect the system to estimate the range of the objects to the image capture point. Estimating range information can be accomplished in many ways, though a common and well-known method involves the use of stereo image pairs.

Range estimation by stereo correspondence is a topic that has been heavily researched. By capturing images from two different locations that are a known distance apart, orthographic range to any point in the scene can be estimated if that point can be found in both images. (Orthographic range is the orthogonal distance from a real world point to a plane parallel to an image plane passing through the rear nodal point of the capture device.) The difficulty in this method of range estimation is finding correspondence points. A variety of stereo correspondence algorithms exists; see for example. Y. Ohta and T. Kanade, *Stereo by Intra-and Inter-Scanline Search Using Dynamic Programming*, IEEE Transactions on Pattern Analysis and Machine Intelligence, Vol. PAMI-7, No. 2, March, 1985, pp. 139–154, and I. J. Cox, S. O. Hingorani, S. B. Rao, and B. M. Maggs, *A Maximum Likelihood Stereo Algorithm*, Computer Vision and Image Understanding, Vol. 63, No. 3, May 1996, pp. 542–567.

Conventionally, stereo images are captured using two optical systems having parallel optical axes, with the plane formed by the optical axis and vector between image centers being parallel to the ground. The reason for this arrangement is that stereo images are typically used to give the viewer a perception of three-dimensionality, and the human visual system has this arrangement. There have been systems producing stereo panoramic images, (see Huang and Hung, *Panoramic Stereo Imaging System with Automatic Disparity Warping and Seaming*, Graphical Models and Image Processing, Vol. 60, No. 3, May, 1998, pp. 196–208); however, these systems use a classical side-by-side stereo system as their intent is to utilize the stereo images for a human viewer, and not to estimate the depth of objects. One problem of the side-by-side approach is that panoramic images are best captured when the axis of rotation is at the rear-nodal point of the optical system. In a conventional side-by-side configuration this is geometrically impossible. As a result, at least one of the panoramic images is suboptimal.

In the conventional camera arrangement for stereo imaging, the horizontal distance between the two cameras is commonly referred to as the baseline distance. With this arrangement the corresponding points in the two images can be found on the same horizontal line in the image. For a digital system this implies that a corresponding point exists in the same scan line for each image, though the position within the scan line of each image will differ depending upon the distance of the associated object from the cameras. According to the aforementioned Ser. No. 09/162,310, which is incorporated herein by reference, stereo imaging is achieved by capturing stereo image pairs that are displaced from each other along a vertical axis through the rear nodal point of a taking lens, rather than being displaced along a horizontal axis as in the conventional stereo image capture systems. This configuration retains the advantage of the conventional stereo capture configuration, in that points in one image of the stereo pair have their corresponding point in the other image of the pair along a line; however, the line is now a vertical line, which simplifies the formation of depth data for panoramic images.

Figure 1A:
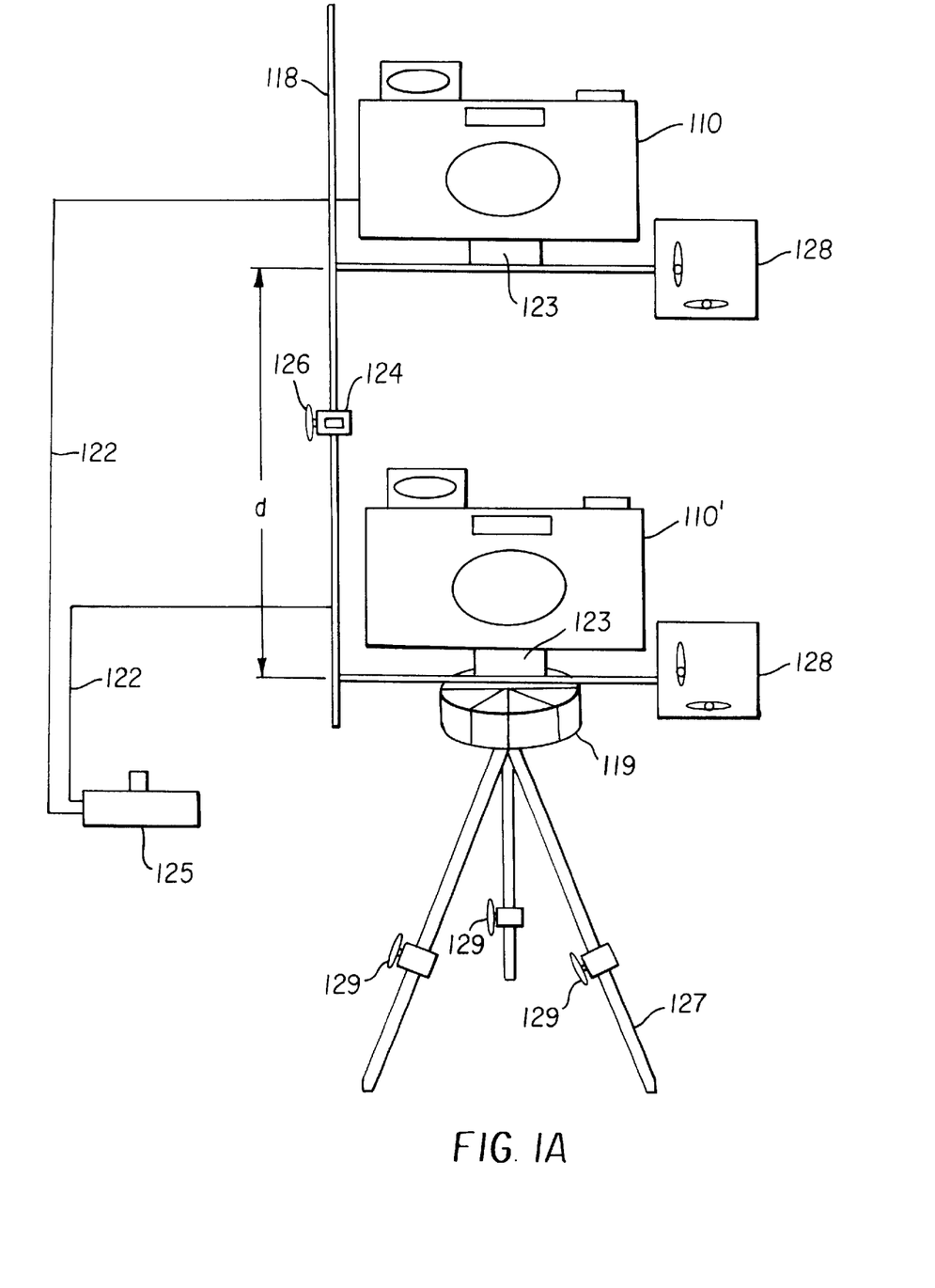
FIG. 1A is a diagram of the image capture system.

Referring now to FIG. 1, the apparatus described in copending Ser. No. 09/162,310 for capturing a collection of stereo images to produce a 360° panoramic image with range data includes a pair of 360° stereoscopic cameras 110 and 110' that are mounted on a rotating camera support for rotation about the respective rear nodal points of the cameras. The rotating camera support includes a support rod 118 that is mounted for rotation in a base 119. The operator rotates the camera assembly after each photograph in the series. The rotation angle is sufficiently small to permit adequate overlap between successive images for the subsequent "image stitching." An angle of 30° is generally adequate, but the amount of rotation is dependent upon the field of view of the camera system. The cameras 110 and 110' are vertically displaced from each other along the rotating camera support rod 118 to provide a baseline distance d.

Each camera 110, 110' has an optical axis, and alignment between the two cameras must assure that the two optical axes are as parallel as possible. The cameras are mounted such that they share the same rotational angle. In order to keep the cameras in vertical alignment a set of level indicators 128 are mounted on the support mechanism. The camera mounts 123 lock a camera to eliminate any side-to-side rotation creating misalignment between the two cameras. The base 127 is like a common camera tripod and the lengths of the three legs are adjustable, each with a locking mechanism 129. By using the locking mechanism 129 and the level indicators 128 the operator can align the cameras to be displaced solely in the vertical direction. In order to activate the cameras, a remote shutter 125 is used which triggers both cameras simultaneously. The cameras are connected to the shutter control by a pair of wires 122 or by an RF control signal.

The cameras 110, 110' are assumed to be identical and share in the same optical specifications, e.g., focal length and field of view. The baseline distance d of the two cameras 110, 110' directly influences the resolution of depth estimates for each point in the 360° panoramic image. The amount of baseline is a function of the expected distance from the camera to the objects of interest. To permit this adjustment, the camera system has an adjustable vertical distance mechanism 124, such as an adjustable rack and pinion on the rotating camera support rod 118. The amount of vertical baseline is displayed on a vernier gauge 126 on the support rod 118. The displacement distance d must be noted and employed in accurately estimating the distance from the cameras to the objects. Creating a panoramic environment map from the resulting series of overlapping images can be divided into three tasks: cylindrical warping, image registration, and image blending.

What is needed is a more effective way of processing stereo pairs of images in order to accomplish these tasks and synthesize a panoramic environment map containing intensity (not precluding color) and range information present in a scene. Two problems are introduced when applying panoramic stitching techniques to range estimates: first, range estimates are an orthographic distance from objects to a plane parallel to the image plane, and second, range estimates are available only at a sparse sampling of points. These problems prohibit current panoramic stitching techniques from being adequate for the task of stitching together range estimates. If these problems could be solved, it would be possible to create a much improved panoramic environment map containing both intensity and range information.

SUMMARY OF THE INVENTION

The present invention is directed to overcoming one or more of the problems set forth above. Briefly summarized, according to one aspect of the present invention, a method for generating a panoramic environment map from a plurality of stereo image pairs begins by acquiring a plurality of stereo image pairs of the scene, wherein there is an overlap region between adjacent stereo image pairs. Then orthographic range values are generated from each of the stereo image pairs corresponding to the orthogonal distance of image features in the stereo pairs from an image capture point. The range values are transformed into a coordinate system that reflects a common projection of the features from each stereo image pair and the transformed values are then warped onto a cylindrical surface, forming therefrom a plurality of adjacent warped range images. The adjacent warped range images are registered and then the overlap regions of the registered warped range images are blended to generate a panoramic environment map containing range information. The range information is then concatenated with intensity information to generate an environment map containing both range and intensity information.

While current methods of generating composite panoramic scenes are used in applications such as virtual reality, the advantage of the invention is that the augmentation of range information to these scenes can extend the degree of interaction experienced by the user in a photorealistic virtual world.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

In the following description, a preferred embodiment of the present invention will be described as a software program. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein may be selected from such systems, algorithms, components and elements known in the art. Given the description as set forth in the following specification, all software implementation thereof is conventional and within the ordinary skill in such arts.

Still further, as used herein, the software program may be stored in a computer readable storage medium, which may comprise, for example; magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program. Before describing the present invention, it facilitates understanding to note that the present invention is preferably utilized on any well-known computer system, such a personal computer. Consequently, the computer system will not be discussed in detail herein. It is also instructive to note that the images are either directly input into the computer system (for example by a digital camera) or digitized before input into the computer system (for example by scanning an original, such as a silver halide film).

The present invention describes a method that combines the ideas of range estimation and panoramic stitching. If a system of vertically displaced cameras (e.g., the system described in the aforementioned Ser. No. 09/162,310) captures a series of images while being rotated around the axis through the rear nodal points of each camera, a stereo correspondence algorithm can be employed to estimate the range of objects in each pair of images; then, an extension of a panoramic stitching algorithm can be used to create a panoramic environment map of both the captured intensity information and the estimated range information. As mentioned before, two problems prohibit current panoramic stitching techniques from being adequate for the task of stitching together range estimates. The first problem, relating to range estimates being an orthographic distance from objects to a plane parallel to the image plane, can be remedied by transforming the orthographic distance (hereafter referred to as planar range) to a perspective distance about the axis through the rear nodal points of the taking lenses (hereafter referred to as perspective range) or to an orthographic distance (hereafter referred to as directional range) about a given viewpoint. The second problem, relating to range estimates being available only at a sparse sampling of points, can be remedied using a general morphological technique described in this disclosure. By combining the method of range estimation by stereo correspondence with the creation of panoramic environment maps and by solving the problems introduced when applying panoramic stitching techniques to range estimates, this invention provides a means to create a panoramic environment map containing both intensity and range information.

Figure 1B:
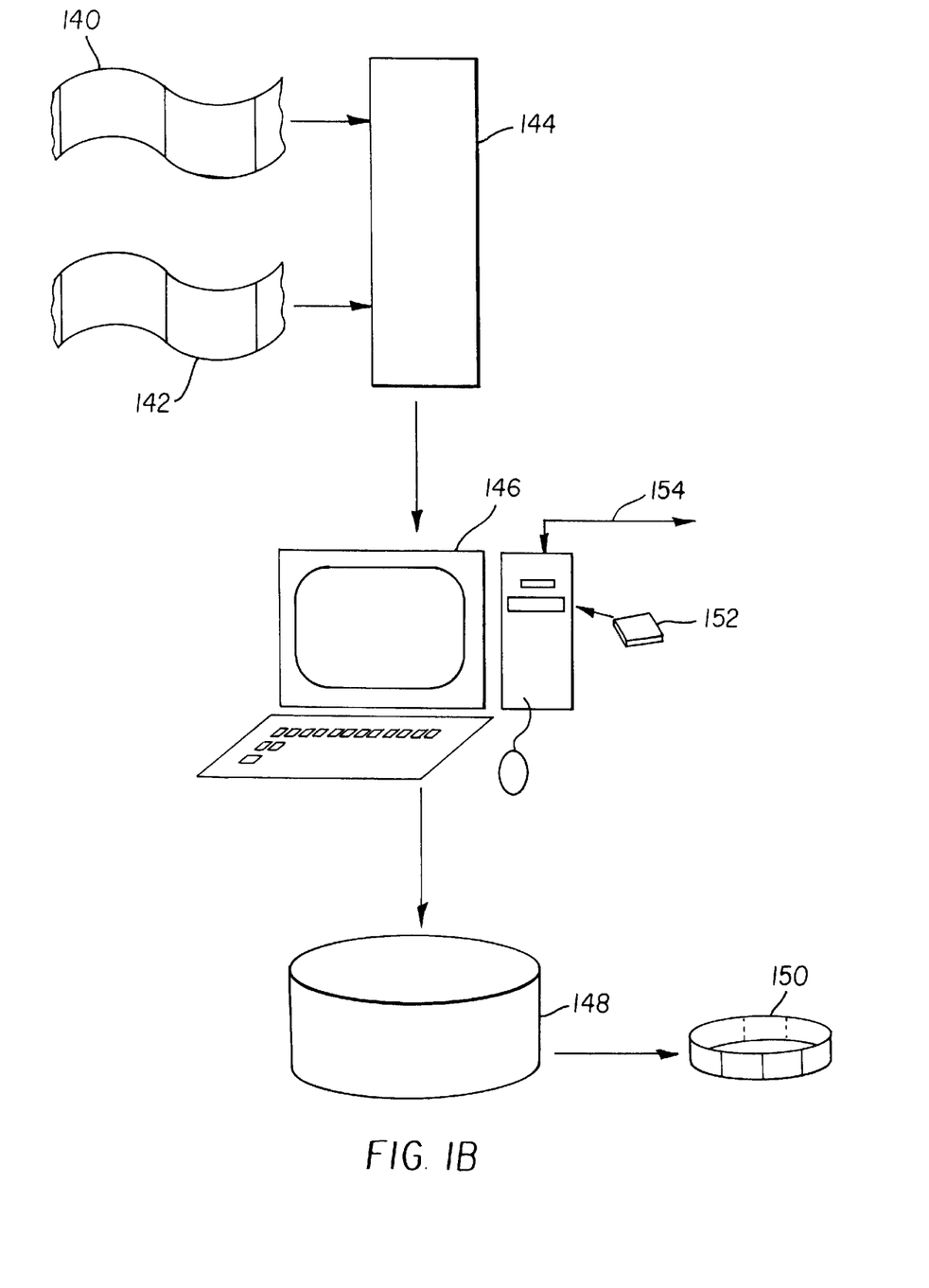
FIG. 1B is a schematic block diagram showing an image processing system employed to extract depth information from the images captured by the apparatus shown in FIG. 1A.

Referring to FIG. 1A, the preferred method of capture of stereo pairs is as shown therein, which is the method described in the aforementioned Ser. No. 09/162,310, i.e., an imaging system wherein two series of images spanning the desired environment are captured. Referring to FIG. 1B, once the images are captured they are stored either in film or as digital files within a camera. Each camera 110 and 110' has its record of images 140 and 142. These images have to be prepared for additional processing. In the case of images captured on film, the film has to be developed and sent through a digitization processor 144 and the images captured as vertical pairs need to be associated. In the case of digital images, the processor 144 does not digitize the images, but rather it retrieves the images from the respective cameras and then associates vertical pairs. Two series of images spanning the desired environment are captured; the first series 140 is captured about a first point on a vertical axis through the rear nodal point of a taking lens of the camera 110, and the second series 142 is captured about a second distinct point on the same vertical axis through the rear nodal point of a taking lens of the camera 110'. The series of vertical pairs are then entered into an image processing computer 146 where the range is estimated and the images are stitched to form a panoramic image 150 incorporating range information. The resultant panoramic image with range information is then stored into a mass storage device 148 for future use. The programs performing the method according to the invention are either resident in the computer 146, stored on a storage device 152 (e.g., floppy disk, CD, solid state memory card, etc.) that is inserted into the computer, or downloaded via a network connection 154. For the remainder of this disclosure, we will assume without loss of generality that the first point is higher than the second, and thus prescribe the terms "upper" and "lower" to the first series 140 and second series 142 of images, respectively, or to specific images in those series. A one-to-one correspondence of upper and lower images should exist; within each upper/lower pair there should not be any disparity in the horizontal direction. A system deviating from either of these two constraints can be conceived, but this system performs an equivalent task.

Figure 2:
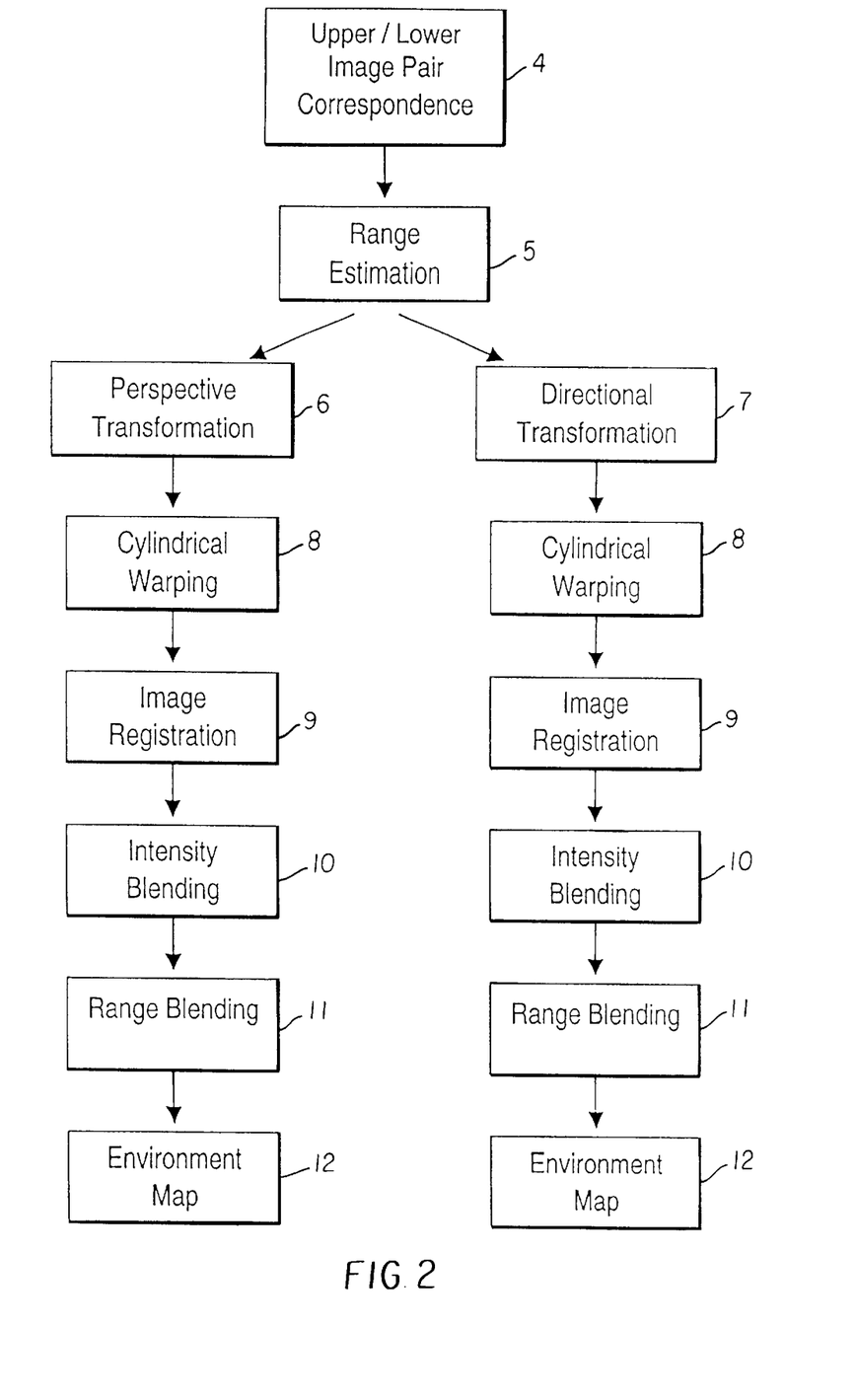
FIG. 2 describes the steps taken in the synthesis of a panoramic environment map with range information.

Referring to FIG. 2, once the one-to-one correspondence of upper and lower images has been established (step 4), a range estimation algorithm (step 5) is employed. If the method of range estimation yields planar range estimates, those estimates must be transformed by a perspective transformation (step 6) to yield perspective range estimates or by a directional transformation (step 7) to yield directional range estimates. Since images are a perspective projection of real world objects onto a plane, an inherent distortion exists. In order to remove this distortion and keep sizes of objects consistent from image to image, the intensity images and corresponding perspective/directional range maps must be projected onto a cylinder (step 8). A registration algorithm (step 9) is then employed to determine the specific point (registration point) where adjacent images overlap. Once registration points have been determined, adjacent sets of overlapping cylindrically warped intensity images can be blended together (step 10) recursively to synthesize an intensity environment map. Adjacent sets of overlapping cylindrically warped range maps can be blended together (step 11) to synthesize a range environment map. The intensity and range environment maps can then be concatenated to produce an environment map (step 12) containing intensities and corresponding range estimates.

Figure 3:
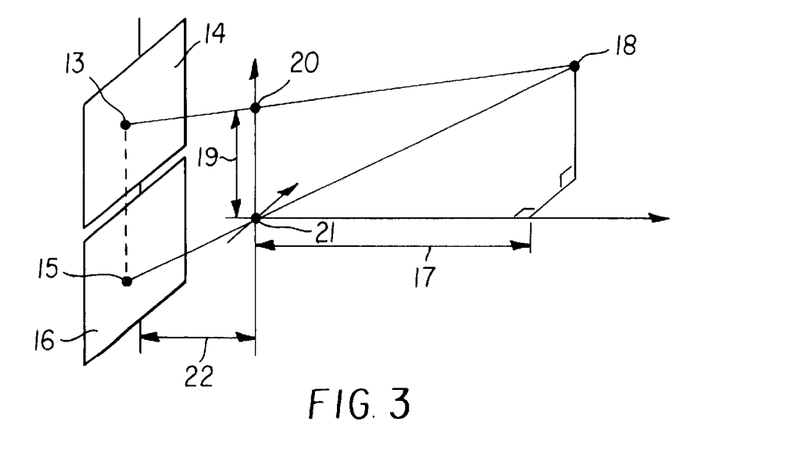
FIG. 3 is a diagram of the stereo correspondence technique used to estimate range.

Referring to FIG. 3, because there is no horizontal displacement of upper/lower image pairs, a pixel 13 in a given column of an upper image 14 will correspond to a pixel 15 in the same column of a lower image 16, i.e., both pixels 13 and 15 will correspond to the same image feature. While image correspondence can be established in a variety of ways, including the algorithms described in the aforementioned Ohta and Kanade, and Cox et al papers, the preferred technique is described in the aforementioned copending Ser. No. 09/382,451, entitled "Method for Forming a Depth Image from Digital Image & Data", which is incorporated herein by reference. If exact correspondence can be established, the disparity d between the location of pixels on each image can be used to compute the range 17 of a real world point 18 projected into those pixels. In fact, the relationship between disparity and range can be given by:

$$r = \frac{bf}{d},$$

where r is the range 17, b is the baseline distance 19 between the rear nodal point 20 of the upper camera and the rear nodal point 21 of the lower camera, and f is the focal length 22 of the taking lens.

Figure 4A:
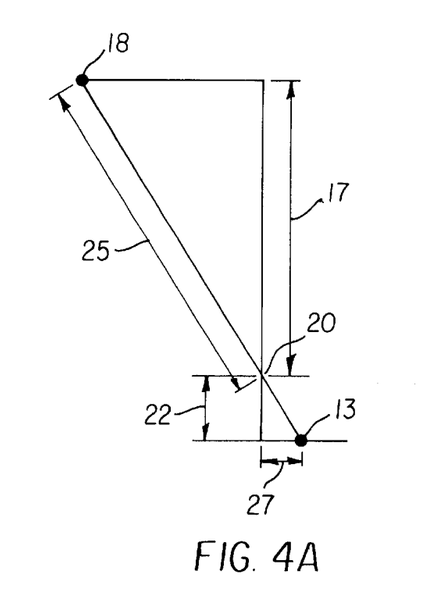
FIG. 4A is a diagram of the relationship between planar range and perspective range.
Figure 4B:
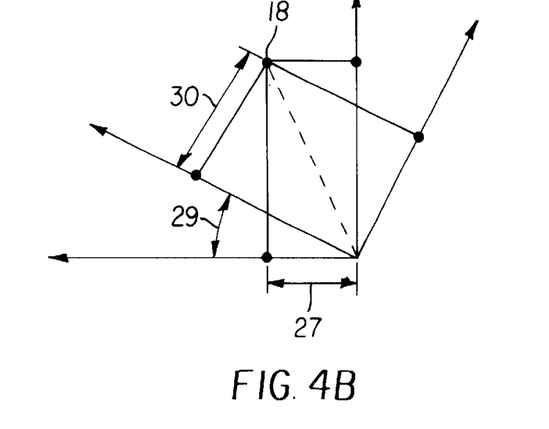
FIG. 4B is a diagram of the relationship between planar range and directional range.

Referring to FIGS. 4A and 4B, and considering the upper image 14 in FIG. 3, the range 17 computed from the preferred range estimation algorithm is orthographic (i.e., the orthogonal distance from the real world point 18 to the plane parallel to the image plane passing through the rear nodal point 20). In order to create an environment map that reflects a common projection of real world objects into each image, either perspective range 25 (i.e., a perspective projection about the vertical axis) or directional range (i.e., an orthographic distance given a fixed viewpoint) must be computed. In the preferred embodiment, perspective range is used because it allows for creation of a view-independent environment map that can contain up to 360° of information. In other embodiments, directional range may be preferred because it can make post-processing of environment maps easier if a desired viewpoint is initially specified. In general, however, directional range maps can only yield view-dependent environment maps that contain less than 180° of information. Referring to FIG. 4A, perspective range $\hat{r}_p$ (25) can be computed by using similar triangles:

$$\hat{r}_p = r\sqrt{1 + \left(\frac{d}{f}\right)^2}$$

where r is the orthographic range 17 of the real world point 18, f is the focal length 22 of the taking lens, and d is the distance 27 from the center of the image to the pixel 13 containing the projection of the real world point 18. (It should be clear that the same analysis applies to the lower image 16 in FIG. 3.) For directional range, referring to FIG. 4B, a view orthogonal to the vertical axis must be chosen. Each image will have associated with it an angle θ (29) to the plane orthogonal to the chosen viewpoint. It can be proven geometrically that directional range $\hat{r}_d$ (30) can be computed by:

$$\hat{r}_d = \frac{r}{f}(d\sin\theta + \cos\theta)$$

where r is the orthographic range estimate 17 and f is the focal length 22. For the remainder of this disclosure, "range" will refer to perspective/directional range.

Figure 5A:
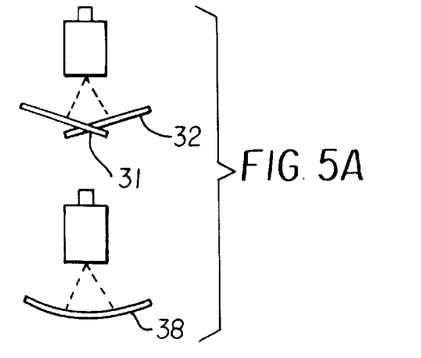
FIG. 5A is a diagram illustrating the need for cylindrical warping.
Figure 5B:
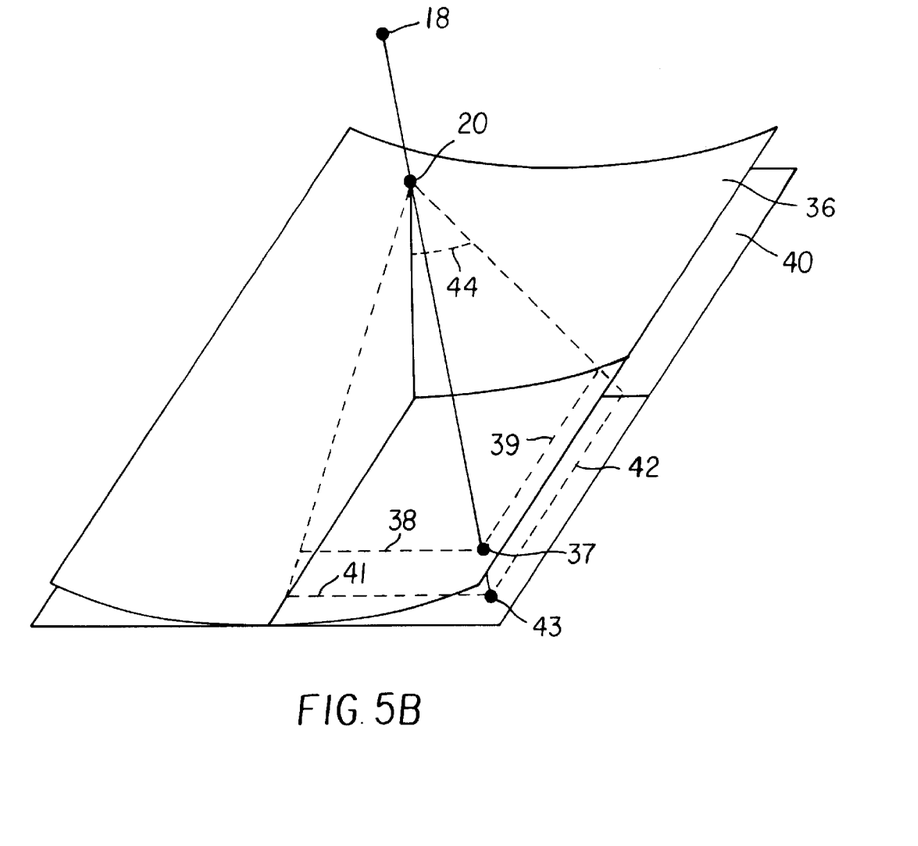
FIG. 5B is a diagram that illustrates the cylindrical warping procedure.

Referring to FIGS. 5A and 5B, because images captured from a camera 10 (or 10') are projections of objects through the nodal point of the taking lens into a plane, an inherent distortion exists. Objects near the center of an image appear smaller than objects near the edges; this distortion is evident in regions 31 of overlap between images 32. In order to create a cylindrical environment map containing no distortion, the intensity images and range maps must be warped onto a cylinder 33 about the vertical axis of the cylinder. The cylindrical warping can be achieved in the following manner; suppose the real world point 18 is projected through the rear nodal point 20 of the taking lens onto the cylinder 36 at point 37 (x,y), where x is the horizontal pixel coordinate 38 and y is the vertical pixel coordinate 39 (relative to the orthogonal projection of the nodal point 20 onto the image plane 40). The intensity/range value assigned to the cylindrically warped image at point 37 (x,y) should be the intensity/range value found at point 43 (x',y') in the planar image 40, where x' is the horizontal pixel coordinate 41 and y' is the vertical pixel coordinate 42 of point 43. It can be shown that (x',y') can be computed in the following way:

$$x' = \frac{\tan(xp_x/f)}{p_x/f}, \quad y' = \begin{cases} \frac{y\tan(xp_x/f)}{xp_x/f}, & x \neq 0 \\ y, & x = 0 \end{cases},$$

where $p_x$ is the length of pixels of the image plane 40 in the x-direction and f is the focal length 22 of the taking lens. In general, (x',y') will not be integer valued, so it is appropriate to interpolate nearby intensity values. For range values, it is only appropriate to assign the value of the pixel nearest (x',y').

Figure 6A:
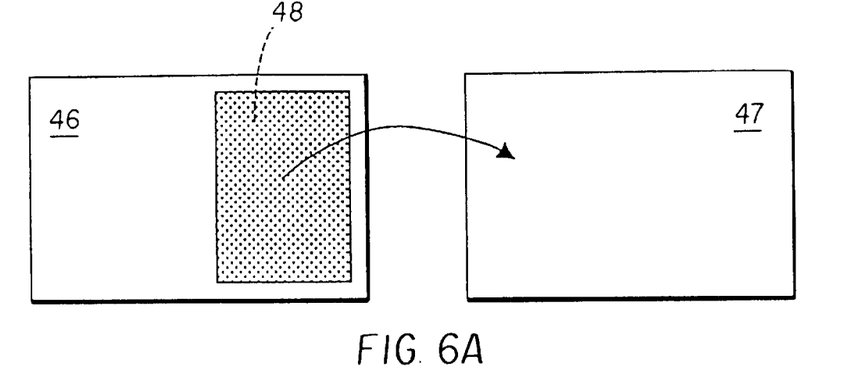
FIGS. 6A and 6B are diagrams of the registration algorithm.
Figure 6B:
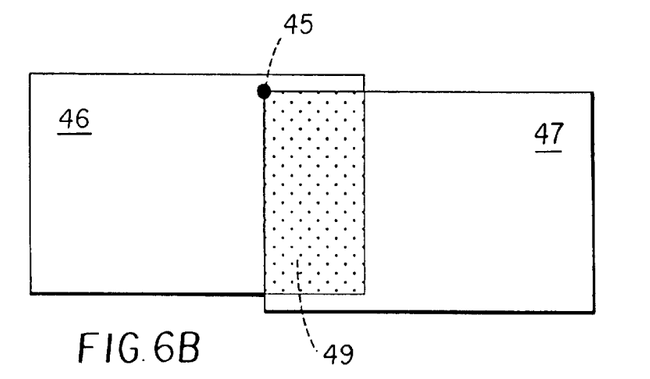

Referring to FIG. 6B, the registration point 45 of adjacent cylindrically warped images 46 (left) and 47 (right) must be found. Any of a variety of image alignment techniques can be used to register the left 46 and right 47 images, e.g., see C. D. Kuglin and D. C. Hines, "The Phase Correlation Image Alignment Method", *Proc. 1975 International Conference on Cybernetics and Society*, pp. 163–165, 1975. Although the adjacent cylindrically warped intensity images and the adjacent cylindrically warped range images may be separately registered, since the coordinates of the range images correspond exactly to those of the intensity images, common values in the adjacent cylindrically warped intensity images are registered and then registration points in the warped range images are defined to be in the same locations as those used for registering the intensity images. FIG. 6A illustrates the extraction of a region 48 from the left intensity image to be used as a template. The output of the image alignment method yields the overlap region 49 between the left 46 and the right 47 intensity images. The registration point 45 is taken to be the upper left hand corner of the overlap region 49; but, in general, can be defined as any point which identifies the location of the overlap region.

Figure 7:
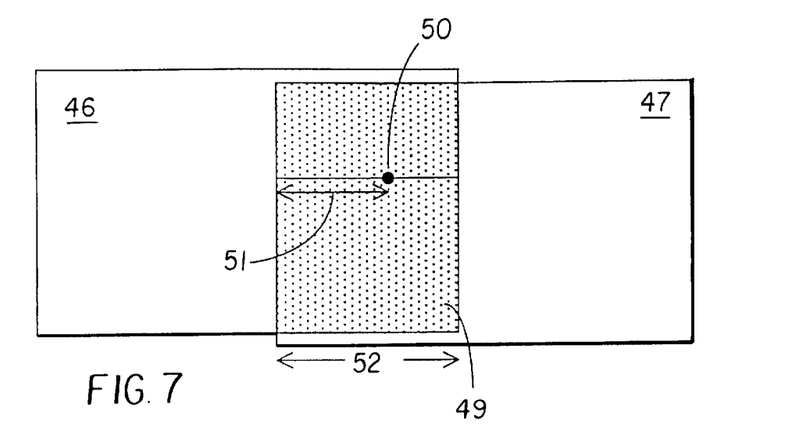
FIG. 7 illustrates the method of blending based on a combination of the information present in each image.

FIG. 7 illustrates a method of blending together the overlap region 49 between the left 46 and right 47 images. (Unlike the registration process, blending is performed on both the intensity and range images.) The intensity I assigned to point P (50) in the overlap region can be found by taking a combination of the intensity $I_L$ at P in the left image 46 and the intensity $I_R$ at P in the right image 47. The preferred intensity blending method computes a weighted average of $I_L$ and $I_R$:

$$I = wI_R + (1-w)I_L,$$

where the weight w is the normalized distance from the left side of the overlap region to P. The normalized distance can be found by dividing the distance 51 from the left side of the overlap region to P by the width 52 of the overlap region. Other methods of computing a weighted average can be conceived; they do not deviate from the spirit or scope of this invention. If the range estimation procedure yielded a fully populated range map, then this intensity blending technique could be used for the range data. However, since the stereo correspondence method ordinarily yields sparse range estimates, blending range maps together is generally a more complicated procedure than blending intensity images together.

Figure 8A:
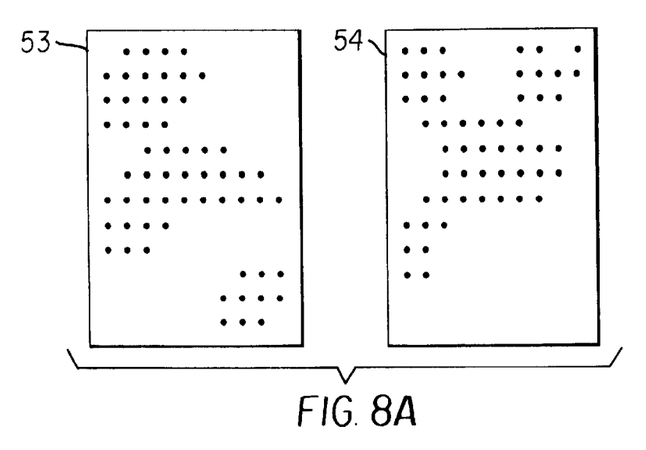
FIGS. 8A, 8B and 8C contain a realization of the structural representation of the segments of sparse range images that are blended together.
Figure 8B:
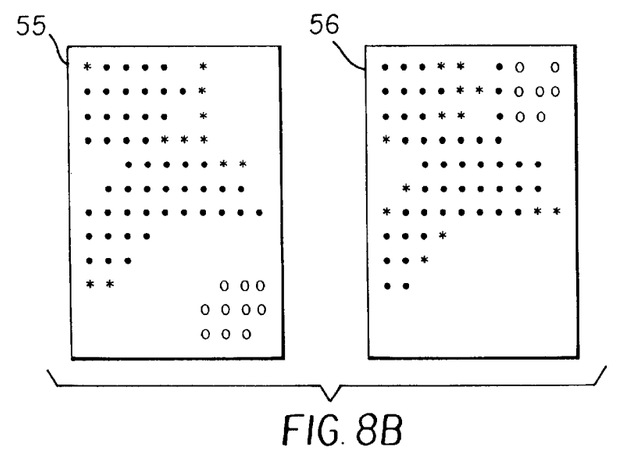

FIG. 8 illustrates a range blending method. If left and right images 46 and 47 are now considered to be left and right range maps, respectively, then overlap regions 53 and 54 in FIG. 8A are realizations of segments of the left and right range maps, respectively, that correspond to the overlap region between the adjacent left and right range images 46 and 47. These realizations do not show specific range values in the figures; rather, they show the sparse set of points (denoted by .'s) where range estimates exist. Left and right segments 55 and 56 in FIG. 8B illustrate the situation after a structural comparison between the segments has been performed. For each segment, the structural comparison consists of identifying pixels having no range estimates that are within a prescribed radius of pixels containing range estimates. If an identified pixel corresponds to a location in the other segment where a range estimate exists, the identified pixels is denoted by *. Range estimates are computed at *-pixels by extrapolating any known range estimates within the prescribed radius. Pixels with known range estimates in one segment that are in the same location as pixels in the other segment where there are no known range estimates within the prescribed radius are denoted by o.

Figure 8C:
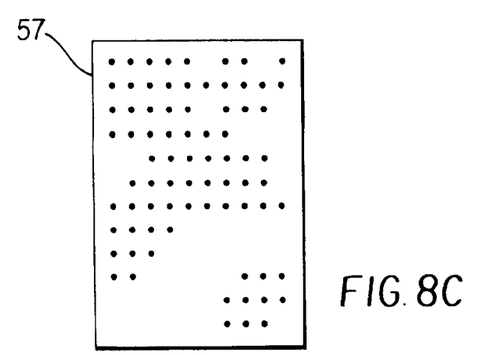

In order to create a blended segment 57 as shown in FIG. 8C, note that a point P (50) is located in a position that either has range estimates in both the left 55 and right 56 segments (.-pixels or *-pixels), range estimates in only one segment (o-pixels), or no range estimates in either segment. In the first case, the range value assigned at P can be found by taking a combination of the corresponding range estimates in the left and right segment in the same manner as was performed in the intensity blending segment. In the second case, the range value assigned at P is copied directly from whichever of the two segments contains the range estimate. In the third case, since no range estimates exist in either left 55 or right 56 segment, no range value is assigned at P. A method of range blending can be conceived which does not perform the step of identifying *-pixels; however, the method described in this disclosure degenerates to one that does not identify *-pixels if the prescribed radius is taken to be zero.

Once a blended intensity image and a blended range map have been constructed, they can be concatenated to form a panoramic environment map containing both intensity and range information.

The invention has been described with reference to a preferred embodiment. However, it will be appreciated that variations and modifications can be effected by a person of ordinary skill in the art without departing from the scope of the invention.

PARTS LIST

| | |
|---|---|
| 4 | step |
| 5 | step |
| 6 | step |
| 7 | step |
| 8 | step |
| 9 | step |
| 10 | step |
| 11 | step |
| 12 | step |
| 13 | pixel |
| 14 | upper image |
| 15 | pixel |
| 16 | lower image |
| 17 | range |
| 18 | real world point |
| 19 | baseline |
| 20 | rear nodal point of upper camera |
| 21 | rear nodal point of lower camera |
| 22 | focal length |
| 25 | perspective range |

-continued

PARTS LIST

| | |
|---|---|
| 27 | distance |
| 28 | projected pixel |
| 30 | directional range |
| 31 | overlap regions |
| 32 | images |
| 33 | cylinder |
| 36 | cylinder |
| 37 | point (x, y) |
| 38 | horizontal pixel coordinate |
| 39 | vertical pixel coordinate |
| 40 | image plane |
| 41 | horizontal pixel coordinate |
| 42 | vertical pixel coordinate |
| 43 | point (x', y') |
| 45 | registration point |
| 46 | left image |
| 47 | right image |
| 50 | point |
| 51 | distance |
| 52 | width |
| 53 | overlap regions |
| 54 | overlap regions |
| 55 | left segment |
| 56 | right segment |
| 110, 110' | stereoscopic cameras |
| 118 | support rod |
| 119 | base |
| 122 | wives |
| 123 | camera mounts |
| 124 | vertical baseline mechanism |
| 125 | remote shutter |
| 126 | vernier gauge |
| 127 | base |
| 128 | level indications |
| 129 | locking mechanism |
| 140 | first series of images |
| 142 | second series of images |
| 144 | processor |
| 146 | image processing computer |
| 148 | mass storage device |
| 150 | panoramic image |
| 152 | storage device |

What is claimed is:

1. A method for generating a panoramic environment map from a plurality of stereo image pairs of a scene, said method comprising the steps of:
    (a) acquiring a plurality of stereo image pairs of the scene, wherein there is an overlap region between adjacent stereo image pairs;
    (b) generating orthographic range values from each of the stereo image pairs corresponding to the orthogonal distance of image features in the stereo pairs from an image capture point;
    (c) transforming the range values into transformed range values referenced to a coordinate system that reflects a common projection of the features from each stereo image pair;
    (d) warping the transformed range values onto a cylindrical surface, and forming therefrom a plurality of warped range images;
    (e) registering the adjacent warped range images; and
    (f) blending the overlap regions of the registered warped range images to generate a panoramic environment map containing range information.

2. A method as claimed in claim 1 wherein the step (a) of acquiring a plurality of stereo image pairs of a scene comprises the steps of:
    a) capturing a first panoramic image of the scene from a first point on a vertical axis; and b) capturing a second panoramic image of the scene from a second point on the vertical axis, the second point being displaced from the first point by a stereoscopic baseline distance.

3. A method as claimed in claim 2 wherein the step (b) of generating orthographic range values comprises deriving range values from the first and second panoramic images.

4. A method as claimed in claim 1 wherein the step (c) of transforming the range values comprises transforming the range values to perspective range distances about an axis through a rear nodal point of a capture device.

5. A method as claimed in claim 1 wherein the step (c) of transforming the range values comprises transforming the range values to directional range distances about a given viewpoint.

6. A method as claimed in claim 1 wherein the step (g) of blending the registered images comprises comparing the structure of the overlap regions for image pixels having common range values and extrapolating other range values for other pixels where common range values exist within a predetermined distance from each other.

7. A method as claimed in claim 1 further comprising the steps of:
   (g) acquiring a plurality of stereo intensity image pairs of the scene, wherein there is an overlap region between adjacent stereo intensity image pairs;
   (h) warping the intensity values onto a cylindrical surface, and forming therefrom a plurality of warped intensity images;
   (i) registering one or more common values in the overlap regions of the adjacent warped intensity images; and
   (j) blending the overlap regions of the registered warped intensity images to generate a panoramic environment map containing intensity information.

8. A method as claimed in claim 7 wherein the step (e) of registering the warped range images comprises registering the range images to the same locations as were determined during the step (i) of registering the adjacent warped intensity images.

9. A method as claimed in claim 1 further comprising generating a panoramic environment map containing intensity information, and concatenating the panoramic range and intensity environment maps to generate a panoramic environment map containing both range and intensity information.

10. A computer program product for forming a depth image from at least two images of the scene comprising: a computer readable storage medium having a computer program stored thereon for performing the steps of:
   (a) acquiring a plurality of stereo image pairs of the scene, wherein there is an overlap region between adjacent stereo image pairs;
   (b) generating orthographic range values from each of the stereo image pairs corresponding to the orthogonal distance of image features in the stereo pairs from an image capture point;
   (c) transforming the range values into transformed range values referenced to a coordinate system that reflects a common projection of the features from each stereo image pair;
   (d) warping the transformed range values onto a cylindrical surface, and forming therefrom a plurality of warped range images;
   (e) registering the adjacent warped range images; and
   (f) blending the overlap regions of the registered warped range images to generate a panoramic environment map containing range information.

11. A computer program product as claimed in claim 10 wherein the step (a) of acquiring a plurality of stereo image pairs of a scene comprises the steps of:
   a) capturing a first panoramic image of the scene from a first point on a vertical axis; and
   b) capturing a second panoramic image of the scene from a second point on the vertical axis, the second point being displaced from the first point by a stereoscopic baseline distance.

12. A computer program product as claimed in claim 11 wherein the step (b) of generating orthographic range values comprises deriving range values from the first and second panoramic images.

13. A computer program product as claimed in claim 10 wherein the step (c) of transforming the range values comprises transforming the range values to perspective range distances about an axis through a rear nodal point of a capture device.

14. A computer program product as claimed in claim 10 wherein the step (c) of transforming the range values comprises transforming the range values to directional range distances about a given viewpoint.

15. A computer program product as claimed in claim 10 wherein the step (g) of blending the registered images comprises comparing the structure of the overlap regions for image pixels having common range values and extrapolating other range values for other pixels where common range values exist within a predetermined distance from each other.

16. A computer program product as claimed in claim 10 further comprising the steps of:
   (g) acquiring a plurality of stereo intensity image pairs of the scene, wherein there is an overlap region between adjacent stereo intensity image pairs;
   (h) warping the intensity values onto a cylindrical surface, and forming therefrom a plurality of warped intensity images;
   (i) registering one or more common values in the overlap regions of the adjacent warped intensity images; and
   (j) blending the overlap regions of the registered warped intensity images to generate a panoramic environment map containing intensity information.

17. A computer program product as claimed in claim 16 wherein the step (e) of registering the warped range images comprises registering the range images to the same locations as were determined during the step (i) of registering the adjacent warped intensity images.

18. A computer program product as claimed in claim 10 further comprising generating a panoramic environment map containing intensity information, and concatenating the panoramic range and intensity environment maps to generate a panoramic environment map containing both range and intensity information.

* * * * *